US009958841B2

(12) United States Patent
Li et al.

(10) Patent No.: US 9,958,841 B2
(45) Date of Patent: May 1, 2018

(54) METHOD AND DEVICE FOR REMOTELY CONTROLLING HOUSEHOLD APPLIANCE, AND COMPUTER READABLE STORAGE MEDIUM

(71) Applicants: Hisense Co., Ltd, Qingdao (CN); HISENSE USA CORP., Suwanee, GA (US)

(72) Inventors: Yangyang Li, Qingdao (CN); Nan Zhu, Qingdao (CN); Yunxiang Zhuang, Qingdao (CN)

(73) Assignees: Hisense Co., Ltd., Qingdao, Shandong (CN); Hisense USA Corp., Suwanee, GA (US)

( * ) Notice: Subject to any disclaimer, the term of this patent is extended or adjusted under 35 U.S.C. 154(b) by 524 days.

(21) Appl. No.: 14/298,552

(22) Filed: Jun. 6, 2014

(65) Prior Publication Data
US 2015/0134116 A1    May 14, 2015

(30) Foreign Application Priority Data

Nov. 8, 2013 (CN) .......................... 2013 1 0554474

(51) Int. Cl.
G05B 15/02 (2006.01)
H04L 12/28 (2006.01)
H04L 12/58 (2006.01)

(52) U.S. Cl.
CPC .......... *G05B 15/02* (2013.01); *H04L 12/2816* (2013.01); *H04L 51/18* (2013.01);
(Continued)

(58) Field of Classification Search
CPC ............ G05B 15/02; G05B 2219/2642; H04L 12/2816; G04B 2219/2642
(Continued)

(56) References Cited

U.S. PATENT DOCUMENTS 7,631,336 B2    12/2009  Diaz Perez
9,037,968 B1 *   5/2015  Pringle ................. G06F 3/0481
                                                              715/273
(Continued)

FOREIGN PATENT DOCUMENTS

CN         103297533 A        9/2013

OTHER PUBLICATIONS

Pieters, Control Anything Using Twitter!—Mike's Lab, Nov. 22, 2012, Youtube, (runtime 4:05). retrieved from http://youtube.com/watch?v=Yp-4skDfX_c on Sep. 12, 2016. See attached document for screenshot summary.*
(Continued)

*Primary Examiner* — Ziaul Karim
*Assistant Examiner* — Joshua Sanders
(74) *Attorney, Agent, or Firm* — Brinks Gilson & Lione (57) ABSTRACT

Provided is a method and device for remotely controlling a household appliance. The method includes: sending, by a social application client, a control command for a target household appliance, wherein the control command includes an account of the target household appliance, and the account of the target household appliance is a unique social account registered in a social application server when the target household appliance leaves a factory; and controlling, by the social application client, the target household appliance corresponding to the account of the target household appliance according to the control command. A user can directly control the household appliance through the social application client, thus improving the efficiency of controlling the household appliance and reducing the cost.

11 Claims, 4 Drawing Sheets

(52) U.S. Cl.
CPC ...... *H04L 51/32* (2013.01); *G05B 2219/2642* (2013.01); *H04L 2012/2841* (2013.01)

(58) Field of Classification Search
USPC ........................................................ 700/275
See application file for complete search history.

(56) References Cited

U.S. PATENT DOCUMENTS

| | | | |
|---|---|---|---|
| 2001/0025245 A1* | 9/2001 | Flickinger | G06Q 10/06 705/1.1 |
| 2003/0100962 A1* | 5/2003 | Sumita | H04L 12/2803 700/65 |
| 2006/0177066 A1* | 8/2006 | Han | H04L 63/061 380/277 |
| 2007/0294726 A1 | 12/2007 | Drazin | |
| 2008/0178212 A1* | 7/2008 | Kinoshita | H04N 21/4882 725/32 |
| 2009/0276771 A1* | 11/2009 | Nickolov | G06F 9/4856 717/177 |
| 2010/0081475 A1 | 4/2010 | Chiang et al. | |
| 2010/0095240 A1 | 4/2010 | Shiplacoff et al. | |
| 2012/0108230 A1* | 5/2012 | Stepanian | G06F 21/10 455/422.1 |
| 2013/0041951 A1* | 2/2013 | Lee | G05B 15/02 709/204 |
| 2013/0047178 A1 | 2/2013 | Moore et al. | |
| 2013/0214935 A1* | 8/2013 | Kim | G08C 17/02 340/870.02 |
| 2014/0095635 A1* | 4/2014 | Yoshimoto | H04L 51/02 709/206 |
| 2014/0156082 A1* | 6/2014 | Ha | D06F 33/02 700/275 |
| 2014/0223312 A1* | 8/2014 | Hayden | H04L 67/12 715/733 |
| 2015/0046557 A1 | 2/2015 | Rosenberg | |

OTHER PUBLICATIONS

Kamilaris, et. al, Social Networking of the Smart Home, 2010, IEEE, 21st Annual IEEE International Symposium on Personal, Indoor and Mobile Radio Communications (2010), pp. 2632-2637, DOI: 10.1109/PIMRC.2010.5671783.*

Nizami, et. al, Internet of Things: A Proposed Secured Network Topology, Irish Signals & Systems Conference 2014 and 2014 China-Ireland International Conference on Information and Communications Technology (ISSC 2014/CIICT 2014). 25th IET. Jun. 26-27, 2013, DOI: 10.1049/cp.2014.0698. (Retrieved from IEEE Sep. 8, 2016).*

Lloret, et. al, Ubiquitous Monitoring of Electrical Household Appliances, Sensors 2012, 12(11), 15159-15191; doi: 10.3390/s121115159; published Nov. 7, 2012 (retrieved from MDPI Sep. 8, 2016).*

EP 14189473.3-1954, European Search Report dated Feb. 9, 2015, 7 pages.

* cited by examiner

METHOD AND DEVICE FOR REMOTELY CONTROLLING HOUSEHOLD APPLIANCE, AND COMPUTER READABLE STORAGE MEDIUM

CROSS-REFERENCES TO RELATED APPLICATIONS

This application claims priority to Chinese patent application No. 201310554474.6 filed on Nov. 8, 2013, the contents of which are incorporated herein by reference in their entirety.

FIELD

The present invention relates to the technical field of controlling household appliances, and particularly relates to a method and device for remotely controlling a household appliance.

BACKGROUND

With increase of social network users, popularization of home internet and further fusion of communication, computer and consumed household appliance industries, more and more intelligent household appliances (such as air conditioners, refrigerators, televisions and the like) may be remotely controlled through specific client programs. However, in this case, a user needs to separately download a client for controlling the household appliances and needs to open the client each time it will be used, so the process is complex, and the user experience is relatively poor.

SUMMARY

Some embodiments disclose a method for remotely controlling a household appliance, including:

sending, by a social application client, a control command for a target household appliance, wherein the control command includes an account of the target household appliance, and the account of the target household appliance is a unique social account registered in a social application server when the target household appliance leaves a factory; and controlling, by the social application client, the target household appliance corresponding to the account of the target household appliance according to the control command.

Some embodiments further disclose a device for remotely controlling a household appliance, including:

a control command sending module, configured to send a control command for a target household appliance, wherein the control command includes an account of the target household appliance, and the account of the target household appliance is a unique social account registered in a social application server when the target household appliance leaves a factory; and a control module, configured to control the target household appliance corresponding to the account of the target household appliance according to the control command.

Some embodiments further disclose a computer readable storage medium storing one or more programs, which when executed by one or more processors to perform a method, including:

sending, by a social application client, a control command for a target household appliance, wherein the control command comprises an account of the target household appliance, and the account of the target household appliance is a unique social account registered in a social application server when the target household appliance leaves a factory; and controlling, by the social application client, the target household appliance corresponding to the account of the target household appliance according to the control command.

Some embodiments further disclose a device for remotely controlling a household appliance, including: one or more processors; a computer readable memory including instructions that, when executed by the one or more processors, perform operations including:

sending, by a social application client, a control command for a target household appliance, wherein the control command comprises an account of the target household appliance, and the account of the target household appliance is a unique social account registered in a social application server when the target household appliance leaves a factory; and controlling, by the social application client, the target household appliance corresponding to the account of the target household appliance according to the control command.

DETAILED DESCRIPTION OF THE PREFERRED EMBODIMENTS

To make the above-mentioned objects, features and advantages of the present inventions easier to understand, the present inventions will be further illustrated in detail below in conjunction with accompanying drawings and specific embodiments.

One concept of some of the embodiments described herein lies in that each household appliance can have a unique social account in a social application server, and the account corresponds to a unique household appliance ID; after a social application client sends a control command to the social application server, the social application server parses the control command into a control command which can be identified by a household appliance manufacturer server, and forwards the control command and the household appliance ID to the household appliance manufacturer server; the household appliance manufacturer server receives the control command, and then sends the control command to the corresponding household appliance according to the household appliance ID; and the household appliance executes the control command, so that the social application client can control the target household appliance.

Figure 1:
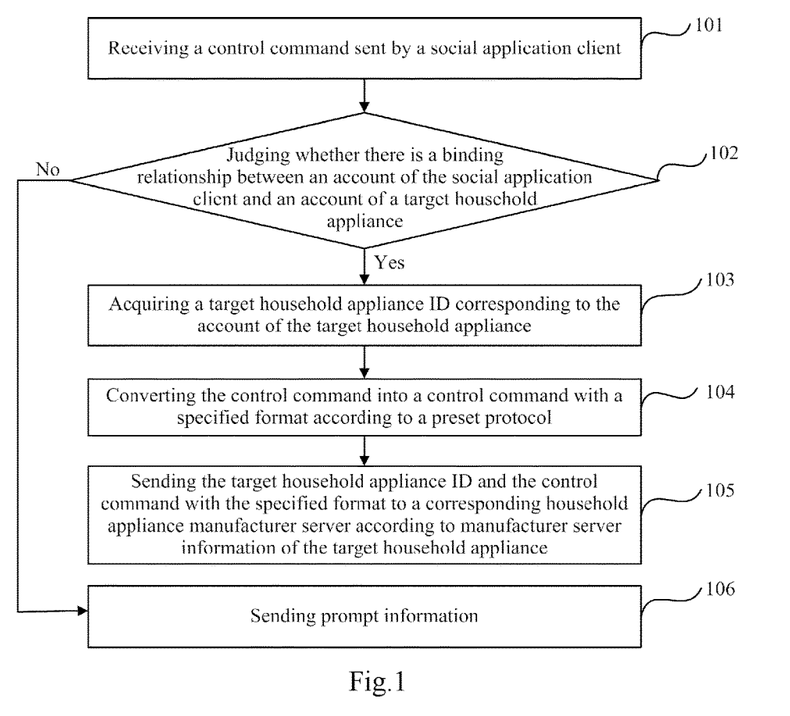
FIG. 1 is a flow chart of a first embodiment of a method for remotely controlling a household appliance.

FIG. 1 shows a flow chart of a first embodiment of a method for remotely controlling a household appliance. In this embodiment, the method is illustrated from a social application server side, and may include the following steps.

Step 101, receiving a control command sent by a social application client;

In the embodiment, the control command is used for informing a target household appliance to execute which operation, such as power-on, power-off and the like, the control command may include an account of the social application client and information of the target household appliance, the information of the target household appliance may include an account of the target household appliance and manufacturer server information of the target household appliance, and the account of the target household appliance is a unique social account registered in the social application server when the target household appliance leaves a factory.

In a specific implementation, the social application client may send the control command to the social application server through a social application communication protocol between the social application client and the social application server. Moreover, the form of the control command sent by the social application client may be text, expression, voice or the like, and is not limited in the embodiments described herein.

It should be noted that the social application client may be any current popular social software APP, such as Sina Weibo, Tencent Weibo, Twitter, Yixin and the like, and the specific type of the social application client is not limited in the embodiments described herein.

Step 102, judging whether there is a binding relationship between the account of the social application client and the account of the target household appliance, if so, executing step 103; otherwise, executing step 106.

In another embodiment, the step 102 may include the following sub-steps:

Sub-step S11, searching for the binding relationship between the account of the social application client and the account of the target household appliance in a binding relationship mapping table, wherein the binding relationship mapping table stores binding relationships between the accounts of one or more social application clients and the accounts of one or more household appliances; if the searching succeeds, executing sub-step S12; otherwise, executing sub-step S13;

Sub-step S12, determining that there is the binding relationship between the account of the social application client and the account of the target household appliance;

Sub-step S13, determining that there is no binding relationship between the account of the social application client and the account of the target household appliance.

In the embodiment, when a user needs to control a household appliance through the social application client, a binding relationship needs to be established firstly between the social application client and the household appliance to be controlled (namely the target household appliance). In practice, the binding relationship between the social application client and the target household appliance may be embodied as a binding relationship between the social accounts registered in the social application server by the social application client and the target household appliance, namely the binding relationship between the account of the social application client and the account of the target household appliance. After the binding relationship is established, the social application server stores the binding relationship in the binding relationship mapping table, to bring convenience to later inquiry.

In another embodiment, the binding relationship between the account of the social application client and the account of the target household appliance may be generated in the following manners:

(1) Receiving a concerning request (such as a request for more information concerning a particular person, place, or thing at a current time or in perpetuity such as by subscribing to a stream of information) sent by the social application client, wherein the concerning request includes the account of the social application client and the account of the target household appliance;

Specifically, after logging in the social account of the social application client, the concerning request may be sent to the target household appliance for concerning in a manner of scanning a two-dimensional code, entering a social homepage of the target household appliance or the like;

(2) Establishing a mutual concerning relationship between the account of the social application client and the account of the target household appliance according to the concerning request;

Specifically, when the social application server receives the concerning request sent by the social application client, the mutual concerning relationship between the account of the social application client and the account of the target household appliance may be established according to the concerning request, and the both with the mutual concerning relationship may communicate with each other;

(3) Receiving a binding request sent by the social application client, wherein the binding request includes the account of the social application client, verification information, the account of the target household appliance and manufacturer server information of the target household appliance;

Specifically, after a user concerns the target household appliance through the social application client, some household appliance information of the social homepage of the household appliance, such as the account of the target household appliance, the manufacturer server information of the target household appliance and the like, may be acquired; then the user may input the verification information (such as a verification code, each household appliance is marked with the corresponding verification code) acquired from the target household appliance through a private message interface between the accounts of the social application client and the target household appliance, and the social application server acquires the verification information from the private message interface;

(4) After the social application server determines that there is the mutual concerning relationship between the account of the social application client and the account of the target household appliance, the social application server acquires a target household appliance ID corresponding to the account of the target household appliance;

In practice, each household appliance has registered a corresponding social account in a social application server before leaving a factory, the social account of each household appliance corresponds to a unique household appliance ID (the household appliance ID is a group of global unique serial numbers for identifying the household appliance), the corresponding relationship between the account of the household appliance and the household appliance ID is stored in the social application server, and when the social application server receives the account of the target household appliance, the target household appliance ID corresponding to the account of the target household appliance may be acquired by inquiring the corresponding relationship;

(5) Sending the verification information and the target household appliance ID to a household appliance manufacturer server corresponding to the manufacturer server information of the target household appliance, wherein the household appliance manufacturer server is used for verifying the accuracy of the target household appliance ID and the verification information, and returning verification success information if both the target household appliance ID and the verification information are accurate;

In practice, when the social application server receives the binding request and determines that there is the concerning relationship between the social application client sending the binding request and the target household appliance, the social application server searches for the corresponding household appliance manufacturer server (the household appliance manufacturer server is a manufacturer server to which the target household appliance belongs) according to the manufacturer server information of the target household appliance, and sends the verification information and the household appliance ID to be bound to the household appliance manufacturer server for verifying, and the household appliance manufacturer server verifies the household appliance ID and the verification code and feeds back the verification result to the social application server, wherein the verification result may include verification success information or verification failure information, and the verification success information is information sent when the household appliance manufacturer server verifies that the household appliance ID and the verification information are consistent with the recorded household appliance ID and verification information (each household appliance ID and the corresponding verification code are recorded in the household manufacturer server); the verification failure information is information sent when the household appliance manufacturer server verifies that the household appliance ID and the verification information are not consistent with the recorded household appliance ID and verification information;

(6) Generating the binding relationship between the account of the social application client and the account of the target household appliance according to the verification success information;

Specifically, after the social application server receives the verification result, the social application server sets the authority of the account of the social application client according to the verification result, namely if the social application server receives the verification success information, the social application server allows the social application client to control the household appliance, and generates and stores the binding relationship between the account of the social application client and the account of the target household appliance; otherwise, the social application server sends prompt information to inform the social application client of binding failure, then the social application client cannot control the household appliance, and the prompt information may include the reason of verification failure.

In practice, the account of one social application client may be bound with the accounts of one or more target household appliances, so that the user can control and manage different types of household appliances.

In a specific implementation, the binding relationship between the account of the social application client and the account of the target household appliance may further include information such as the target household appliance ID, the manufacturer server information of the target household appliance and the like. When the control command received by the social application server does not include the information of the household appliance manufacturer server, the social application server may acquire the related information of the household appliance manufacturer server from the binding relationship after determining that there is the binding relationship between the account of the social application client and the account of the target household appliance, and send the information such as the control command and the like to the household appliance manufacturer server.

Certainly, the social application client may also release the binding relationship with the target household appliance through the following process:

S1, the social application server receives a binding release request sent by the social application client, wherein the binding release request includes the account of the social application client and the account of the target household appliance;

Specifically, the form of sending the binding release request by the social application client may be to cancel concerning the account of the household appliance, to send the binding release request in a private message or the like, and is not limited in the embodiments described herein;

S2, the social application server searches for the binding relationship between the account of the social application client and the account of the target household appliance in the binding relationship mapping table;

S3, the social application server deletes the binding relationship according to the binding release request.

In the embodiment, after receiving the binding release request, the social application server may directly release the binding relationship between the social application client and the target household appliance by deleting the binding relationship between the account of the social application client and the account of the target household appliance, without communicating with the household appliance manufacturer server. After the binding relationship is released, the social application client cannot control the corresponding household appliance.

Step 103, acquiring the target household appliance ID corresponding to the account of the target household appliance; further executing step 104;

Specifically, the corresponding relationship between the account of the household appliance and the corresponding household appliance ID is stored in the social application server, and the corresponding household appliance ID can be acquired by searching for the account of the household appliance in the corresponding relationship.

Step 104, converting the control command into a control command with a specified format according to a preset protocol, wherein the preset protocol is a unified protocol previously agreed by the social application server and each household appliance manufacturer server, and the control command with the specified format is a control command which can be identified by the manufacturer server of the target household appliance; further executing step 105;

Step 105, sending the target household appliance ID and the control command with the specified format to the corresponding household appliance manufacturer server according to the manufacturer server information of the target household appliance;

The household appliance manufacturer server is used for sending the control command with the specified format to the target household appliance corresponding to the target household appliance ID, and the target household appliance is used for executing the control command.

In the embodiment, the social application server agrees to use a unified protocol and a unified interface when communicating with each household appliance manufacturer server, so that convenience is brought to unified management and control of different household appliance manufacturer devices.

After receiving the control command sent by the social application client, the social application server may parse the control command into a control command with a specified format which can be identified by the household appliance manufacturer server through a technology of fuzzy recognition, voice recognition or the like, and map a target household appliance ID according to the account of the target household appliance, and then send the control command with the specified format and the target household appliance ID to the household appliance manufacturer server corresponding to the manufacturer server information of the target household appliance. After receiving the control command with the specified format sent by the social application server, the household appliance manufacturer server finds out destination IP address information according to the target household appliance ID in the control command, and sends the control command to the target household appliance corresponding to the destination IP address information through its own private protocol; the target household appliance receives the control command, and then parses and executes the control command; wherein, the private protocol of each household appliance manufacturer server may be different, as long as the control command can be sent to the target household appliance.

Step 106, sending prompt information.

Specifically, if searching of the binding relationship between the account of the social application client and the account of the target household appliance fails, it indicates that there is no binding relationship between the account of the social application client and the account of the target household appliance, and then the social application server may return the prompt information to the corresponding social application client, to inform the social application client that the household appliance to be controlled is not bound, so the household appliance cannot be controlled.

In another embodiment, the social application server may also receive feedback information sent by the household appliance manufacturer server. In practice, the feedback information is the one actively sent from the household appliance to the social application client, and the user can learn the feedback information of the household appliance through the social application client to know the condition of the household appliance in time. The feedback information is used for feeding back the household appliance information of the household appliance, may include the household appliance ID, and may be the working state of the household appliance, such as reminding the user to turn on or off the household appliance, temperature and humidity information in a family, some abnormity information or alarm information of the household appliance or the like, and the type of the feedback information is not limited in the embodiments described herein.

After receiving the feedback information sent by the household appliance manufacturer server, the social application server acquires the account of the household appliance corresponding to the household appliance ID, searches for the binding relationship of the account of the household appliance in the binding relationship mapping table according to the account of the household appliance to acquire the account of the social application client, and sends the feedback information to the account of the social application client.

The embodiment describes the process of remotely controlling the household appliance from the social application server side. In the embodiment, the user can directly perform classified control on multiple types of household appliances through the social application client, and the user can control the household appliances as chatting with social friends through private messages at ordinary times after opening the social application client, so it is simple and convenient for the user to use, and the efficiency of controlling the household appliances is improved; and the user does not need to install clients customized by different manufacturers or purchase control boxes to control the household appliances, so great convenience is brought for the user to control and manage the household appliances of different manufacturers, and the control cost of the household appliances is reduced.

Figure 2:
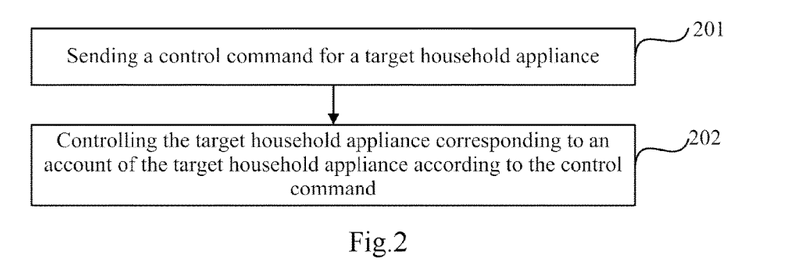
FIG. 2 is a flow chart of a second embodiment of a method for remotely controlling a household appliance.

FIG. 2 shows a flow chart of a second embodiment of a method for remotely controlling a household appliance. In this embodiment, the method is illustrated from a social application client side, and may include the following steps:

Step 201, sending a control command for a target household appliance;

The control command includes an account of a social application client and information of the target household appliance, the information of the target household appliance includes an account of the target household appliance and manufacturer server information of the target household appliance, and the account of the target household appliance is a unique social account registered in a social application server when the target household appliance leaves a factory;

The control command is firstly sent to the social application server, the social application server is used for judging whether there is a binding relationship between the account of the social application client and the account of the target household appliance, if so, the social application server acquires a target household appliance ID corresponding to the account of the target household appliance, and converts the control command into a control command with a specified format according to a preset protocol, wherein the preset protocol is a unified protocol previously agreed by the social application server and each household appliance manufacturer server, and the control command with the specified format is a control command which can be identified by the manufacturer server of the target household appliance; the social application server sends the target household appliance ID and the control command with the specified format to the corresponding household appliance manufacturer server according to the manufacturer server information of the target household appliance, the household appliance manufacturer server is used for sending the control command with the specified format to the target household appliance corresponding to the target household appliance ID, and the target household appliance is used for executing the control command;

Step 202, controlling the target household appliance corresponding to the account of the target household appliance according to the control command.

In the embodiment, a user can send the control command through the social application client to control the target household appliance. In this case, the binding relationship between the social application client and the target household appliance needs to be established firstly. When the social application client needs to be bound with the household appliance, the social account of the household appliance needs to be concerned, and then binding can be completed by sending accurate verification information through a private message. Specifically, the binding relationship between the account of the social application client and the account of the target household appliance is generated in the following manners:

(1) The social application client sends a concerning request for the target household appliance, wherein the concerning request is used for establishing a mutual concerning relationship with the target household appliance;

Specifically, the concerning request includes the account of the target household appliance and the account of the social application client, the mutual concerning relationship is generated by the social application server, specifically, the social application server is used for establishing the mutual concerning relationship between the account of the target household appliance and the account of the social application client according to the concerning request;

(2) Sending a binding request with the target household appliance according to the mutual concerning relationship, wherein the binding request is used for establishing the binding relationship with the target household appliance;

Specifically, the binding request includes the account of the social application client and information of the target household appliance, and the information of the target household appliance includes verification information, the account of the target household appliance and manufacturer server information of the target household appliance. The binding relationship is generated and stored by the social application server, specifically, the social application server is used for determining that there is the mutual concerning relationship between the account of the social application client and the account of the target household appliance, then acquiring the target household appliance ID corresponding to the account of the target household appliance, sending the verification information and the target household appliance ID to the household appliance manufacturer server corresponding to the manufacturer server information of the target household appliance, receiving verification success information returned by the household appliance manufacturer server, and generating the binding relationship between the account of the social application client and the account of the target household appliance according to the verification success information.

In practice, after the binding relationship is established, the social application client may release the binding relationship, specifically, the social application client sends a binding release request with the target household appliance to the social application server, wherein the binding release request includes the account of the social application client and the account of the target household appliance; and then the social application server searches for the binding relationship between the account of the social application client and the account of the target household appliance in a binding relationship mapping table, and deletes the binding relationship.

In the embodiment, besides sending the control command to the target household appliance, the social application client may receive feedback information sent by the target household appliance, so that the user can learn the condition of the target household appliance in time.

Because the embodiment of the method of FIG. 2 basically corresponds to the embodiment of the method of FIG. 1, for the omitted portion in the description of this embodiment, reference can be made to the related illustration in the embodiment of the method of FIG. 1, which is omitted herein.

Figure 3:
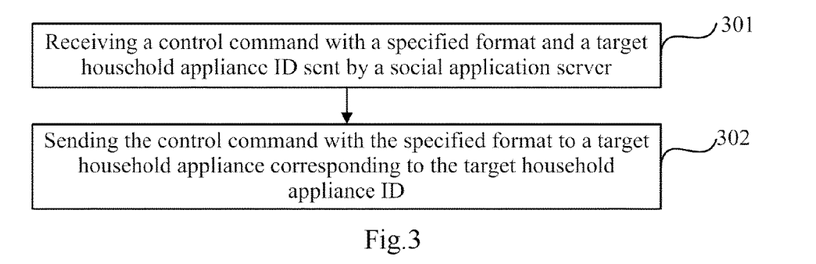
FIG. 3 is a flow chart of a third embodiment of a method for remotely controlling a household appliance.

FIG. 3 shows a flow chart of a third embodiment of a method for remotely controlling a household appliance. In this embodiment, the method is illustrated from a household appliance manufacturer server side, and may include the following steps:

Step 301, receiving a control command with a specified format and a target household appliance ID sent by a social application server;

Step 302, sending the control command with the specified format to a target household appliance corresponding to the target household appliance ID, wherein the target household appliance is used for executing the control command.

Specifically, the household appliance ID and verification information corresponding to the household appliance ID are stored in a household appliance manufacturer server. When receiving the target household appliance ID and the verification information sent by the social application server, the household appliance manufacturer server verifies whether the target household appliance ID and the verification information are consistent with the stored household appliance ID and verification information, if so, the household appliance manufacturer server returns verification success information, and the social application server generates a binding relationship between the account of the target household appliance and the account of the social application client according to the verification success information, so that the social application client can control the target household appliance.

After the household appliance manufacturer server receives the control command with the specified format and the target household appliance ID sent by the social application server, the household appliance manufacturer server finds out destination IP address information according to the target household appliance ID, and sends the control command to the target household appliance through its own private protocol.

In the embodiment, the household appliance manufacturer server may also receive feedback information returned by the household appliance, wherein the feedback information includes the household appliance ID; and the household appliance manufacturer server sends the feedback information to the social application server, and the social application server is used for acquiring the account of the social application client bound with the household appliance ID and sending the feedback information to the account of the social application client.

Because the embodiment of the method of FIG. 3 basically corresponds to the embodiment of the method of FIG. 1, for the omitted portion in the description of this embodiment, reference can be made to the related illustration in the embodiment of the method of FIG. 1, which is omitted herein.

Figure 4:
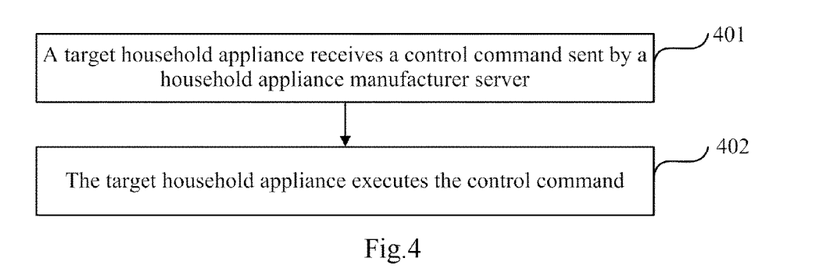
FIG. 4 is a flow chart of a fourth embodiment of a method for remotely controlling a household appliance.

FIG. 4 shows a flow chart of a fourth embodiment of a method for remotely controlling a household appliance. In this embodiment, the method is illustrated from a household appliance side, and may include the following steps:

Step 401, a target household appliance receives a control command sent by a household appliance manufacturer server;

Step 402, the target household appliance executes the control command.

In the embodiment, besides receiving the control command sent by a social application client, the household appliance may also send feedback information to the social application client, specifically, the target household appliance sends the feedback information to the household appliance manufacturer server, wherein the feedback information includes a household appliance ID, the household appliance manufacturer server is used for sending the feedback information to a social application server, and the social application server is used for acquiring the account of the social application client bound with the household appliance ID and sending the feedback information to the account of the social application client.

In the embodiment, each household appliance has been registered with a corresponding social account in the social application server before leaving a factory, each household appliance manufacturer may also register its own social account (namely the account of the household appliance manufacturer, such as the official account) in the social application server, and there is a mutual concerning relationship between the account of the household appliance manufacturer and the account of the household appliance belonging to the manufacturer. When the household appliance fails, the household appliance may actively feed back the failure to the account of the household appliance manufacturer, for example, when the household appliance is controlled through Weibo, the failed household appliance may actively @ the official Weibo of the household appliance manufacturer (e.g., create a post directed "@" the manufacturer); after the household appliance manufacturer receives the failure feedback of the household appliance, the household appliance manufacturer may actively arrange a post sales engineer to contact the user of the failed household appliance; in this case, the household appliance manufacturer can obtain user feedback in the first time, so that the service efficiency and the brand image are improved.

Because the embodiment of the method of FIG. 4 basically corresponds to the embodiment of the method of FIG. 1, for the omitted portion in the description of this embodiment, reference can be made to the related illustration in the embodiment of the method of FIG. 1, which is omitted herein.

Figure 5:
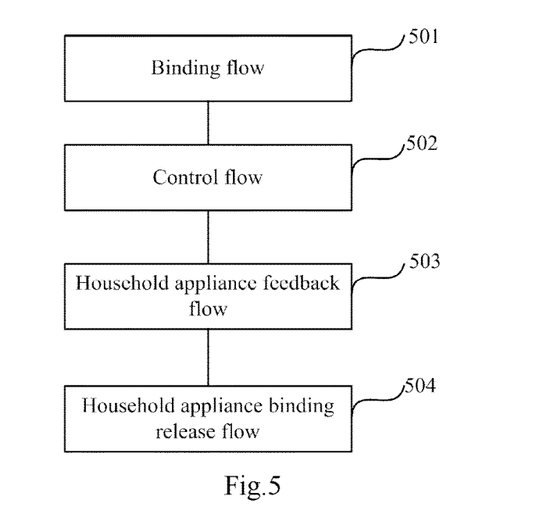
FIG. 5 is a flow chart of a fifth embodiment of a method for remotely controlling a household appliance.

In order to make those skilled in the art better understand the embodiments described herein, various features will be further illustrated below through FIG. 5. FIG. 5 shows a flow chart of a fifth embodiment of a method for remotely controlling a household appliance. The embodiment may include four flows, namely a binding flow 501, a control flow 502, a household appliance feedback flow 503 and a household appliance binding release flow 504.

I, Binding Flow 501

Each household appliance has been registered with a corresponding social account in a social application server before leaving a factory, and each social account corresponds to a unique household appliance ID; and each household appliance ID and a corresponding verification code are recorded in a household appliance manufacturer server. When a social application client needs to be bound with a household appliance, the social application client needs to concern the social account of the household appliance, and then completes binding by sending the accurate verification code through a private message, which specifically may include the following processes:

1, A user logs in his own social account through the social application client and then concerns the target household appliance through scanning a two-dimensional code or entering a social homepage of the household appliance, at this moment, the user can view some basic information of the homepage of the target household appliance, but cannot control the target household appliance;

2, The social application client enters a private message interface to input a verification code and sends the verification code to the social application server, and the social application server may send the verification code and the household appliance ID to be bound to the household appliance manufacturer server for verifying;

3, The household appliance manufacturer server verifies the household appliance ID and the verification code, and feeds back the verification result to the social application server;

4, The social application server sets the authority of the user account according to the verification result, namely if the verification code is accurate, the user is allowed to control the household appliance through the social application client; otherwise, the user cannot control the household appliance through the social application client.

II, Control Flow 502

The social application client successfully bound with the target household appliance may control the target household appliance or inquire the state of the target household appliance in a control command form of expression, textual private messages, voice or the like, which specifically may include the following processes:

1, The social application client sends related information such as the control command of text, expression, voice or the like, the account of the target household appliance and the like to the social application server through a communication protocol between the social application client and the social application server;

2, The social application server parses the control command into a specific command which can be identified by the target household appliance through a technology of fuzzy recognition, voice recognition or the like, maps the target household appliance ID according to the account of the target household appliance, and then sends the parsed control command and target household appliance ID to the household appliance manufacturer server; wherein, the social application server uses a unified protocol and a unified interface when communicating with each household appliance manufacturer server, so that unified management and control of different household appliance manufacturer devices are realized;

3, The household appliance manufacturer server receives the control command sent by the social application server, then finds out destination IP address information according to the target household appliance ID in the control command, and sends the control command to the target household appliance through its own private protocol; the private protocol of each household appliance manufacturer server herein may be different, as long as the control command can be sent to the target household appliance;

4, The target household appliance receives the control command sent by the household appliance manufacturer server, and then parses and executes the control command.

III, Household Appliance Feedback Flow 503

The household appliance may also actively send some information to the social application client, such as reminding a user to turn on or off the household appliance, temperature and humidity information in a family, some abnormity information of the household appliance or the like, thus enabling the user to learn the condition of the household appliance in time, which specifically may include the following processes:

1, The household appliance firstly sends the information to be sent to the household appliance manufacturer server through the respective private protocol of the household appliance manufacturer server;

2, The household appliance manufacturer server sends the information and the household appliance ID to the social application server through the unified interface;

3, The social application server receives the information and then sends the information to the account of the corresponding social application client according to the household appliance ID, and then the social application client can receive the information actively sent by the household appliance.

Certainly, when the household appliance fails, the failed household appliance may actively feed back the failure to the social account of the household appliance manufacturer, which is registered in the social application server, for example, when the household appliance is controlled through Weibo, the failed household appliance may actively @ the official Weibo of the household appliance manufacturer, so that the household appliance manufacturer can actively arrange a post sales engineer to contact the user, thus the service efficiency and the brand image are improved.

IV, Household Appliance Binding Release Flow 504

The operation of releasing the binding is very simple, the user may cancel concerning the social account of the target household appliance or send a command of releasing the binding in a private message, and the social application server directly releases the binding relationship between the account of the social application client of the user and the account of the target household appliance, namely releases the binding relationship with the household appliance without communicating with the household appliance manufacturer server. After the binding is released, the user cannot control the household appliance through the social application client.

Because the embodiment of the method of FIG. 5 basically corresponds to the embodiment of the method of FIG. 1, for the omitted portion in the description of this embodiment, reference can be made to the related illustration in the embodiment of the method of FIG. 1, which is omitted herein.

It should be noted that for the embodiments of the method and for the purpose of simplicity in description, the embodiments are expressed as a combination of a series of actions, but it should be appreciated by those skilled in the art that these are not limited to the described action sequence, because some steps may be performed in another sequence or at the same time according to the various embodiments. Moreover, it should also be appreciated by those skilled in the art that all the embodiments described in the specification belong to example embodiments, and the involved actions are not bound to be necessary in the present invention.

Figure 6:
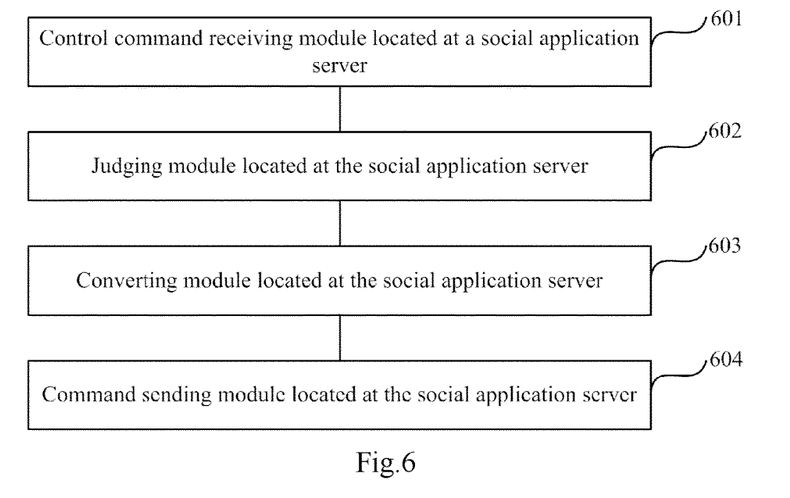
FIG. 6 is a structural block diagram of a first embodiment of a device for remotely controlling a household appliance.

FIG. 6 shows a structural block diagram of a first embodiment of a device for remotely controlling a household appliance, the device may specifically include the following modules:

A control command receiving module 601 located at a social application server, configured to receive a control command sent by a social application client, wherein the control command includes an account of the social application client and information of a target household appliance, the information of the target household appliance includes an account of the target household appliance and manufacturer server information of the target household appliance, and the account of the target household appliance is a unique social account registered in the social application server when the target household appliance leaves a factory;

A judging module 602 located at the social application server, configured to judge whether there is a binding relationship between the account of the social application client and the account of the target household appliance;

A converting module 603 located at the social application server, configured to acquire a target household appliance ID corresponding to the account of the target household appliance when there is the binding relationship between the account of the social application client and the account of the target household appliance and convert the control command into a control command with a specified format according to a preset protocol, wherein the preset protocol is a unified protocol previously agreed by the social application server and each household appliance manufacturer server, and the control command with the specified format is a control command which can be identified by the manufacturer server of the target household appliance;

A command sending module 604 located at the social application server, configured to send the target household appliance ID and the control command with the specified format to the corresponding household appliance manufacturer server according to the manufacturer server information of the target household appliance, wherein the household appliance manufacturer server is used for sending the control command with the specified format to the target household appliance corresponding to the target household appliance ID, and the target household appliance is used for executing the control command.

In another embodiment, the judging module 602 located at the social application server may include the following sub-modules:

A searching sub-module, configured to search for the binding relationship between the account of the social application client and the account of the target household appliance in a binding relationship mapping table, wherein the binding relationship mapping table stores binding relationships between accounts of one or more social application clients and accounts of one or more household appliances;

A determining sub-module, configured to determine that there is the binding relationship between the account of the social application client and the account of the target household appliance when searching of the binding relationship between the account of the social application client and the account of the target household appliance succeeds, and determine that there is no binding relationship between the account of the social application client and the account of the target household appliance when searching of the binding relationship between the account of the social application client and the account of the target household appliance fails.

In another embodiment, the binding relationship between the account of the social application client and the account of the target household appliance may be generated in the following manners:

the social application server receives a concerning request sent by the social application client, wherein the concerning request includes the account of the social application client and the account of the target household appliance;

the social application server establishes a mutual concerning relationship between the account of the social application client and the account of the target household appliance according to the concerning request;

the social application server receives a binding request sent by the social application client, wherein the binding request includes the account of the social application client, verification information, the account of the target household appliance and manufacturer server information of the target household appliance;

the social application server determines that there is the mutual concerning relationship between the account of the social application client and the account of the target household appliance, and then acquires the target household appliance ID corresponding to the account of the target household appliance;

the social application server sends the verification information and the target household appliance ID to the household appliance manufacturer server corresponding to the manufacturer server information of the target household appliance, wherein the household appliance manufacturer server is used for verifying the accuracy of the target household appliance ID and the verification information and returning verification success information if both the target household appliance ID and the verification information are accurate; and the social application server generates the binding relationship between the account of the social application client and the account of the target household appliance according to the verification success information.

In the embodiment, the device may further include the following modules:

A binding release request receiving module located at the social application server, configured to receive a binding release request sent by the social application client, wherein the binding release request includes the account of the social application client and the account of the target household appliance;

A binding relationship searching module located at the social application server, configured to search for the binding relationship between the account of the social application client and the account of the target household appliance in a binding relationship mapping table;

A deleting module located at the social application server, configured to delete the binding relationship according to the binding release request.

In the embodiment, the device may further include the following modules:

A feedback information receiving module located at the social application server, configured to receive feedback information sent by the household appliance manufacturer server, wherein the feedback information includes the household appliance ID;

An account acquiring module located at the social application server, configured to acquire the account of the household appliance corresponding to the household appliance ID, and acquire the account of the social application client bound with the account of the household appliance;

A feedback information sending module located at the social application server, configured to send the feedback information to the account of the social application client.

Figure 7:
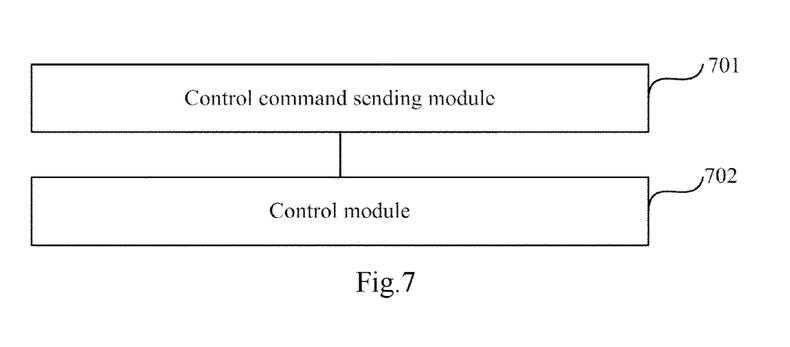
FIG. 7 is a structural block diagram of a second embodiment of a device for remotely controlling a household appliance.

FIG. 7 shows a structural block diagram of a second embodiment of a device for remotely controlling a household appliance, the device may include a social application client, wherein the social application client may specifically include the following modules:

A control command sending module 701, configured to send a control command for a target household appliance, wherein the control command includes an account of the target household appliance, and the account of the target household appliance is a unique social account registered in a social application server when the target household appliance leaves a factory;

A control module 702, configured to control the target household appliance corresponding to the account of the target household appliance according to the control command.

In another embodiment, the device may further include the following modules:

A binding relationship establishing module, configured to establish a binding relationship between the social application client and the target household appliance before the control command sending module sends the control command for the target household appliance.

In another embodiment, the binding relationship establishing module may include the following sub-modules:

A concerning request sending sub-module, configured to send a concerning request for the target household appliance, wherein the concerning request is used for establishing a mutual concerning relationship with the target household appliance;

A binding request sending sub-module, configured to send a binding request with the target household appliance according to the mutual concerning relationship, wherein the binding request is used for establishing the binding relationship with the target household appliance.

Specifically, the binding request includes an account of the social application client and information of the target household appliance, wherein the information of the target household appliance includes verification information, the account of the target household appliance and manufacturer server information of the target household appliance; and the social application server determines there is the mutual concerning relationship between the account of the social application client and the account of the target household appliance, then acquires a target household appliance ID corresponding to the account of the target household appliance, sends the verification information and the target household appliance ID to a household appliance manufacturer server corresponding to the manufacturer server information of the target household appliance and receives verification success information returned by the household appliance manufacturer server, thus the binding relationship is generated according to the verification success information.

In another embodiment, the control command sent by the control command sending module is firstly sent to the social application server; the social application server acquires the account of the social application client, determines that there is the binding relationship between the account of the social application client and the account of the target household appliance, then acquires the target household appliance ID corresponding to the account of the target household appliance, converts the control command into a control command with a specified format according to a preset protocol, and sends the target household appliance ID and the control command with the specified format to the corresponding household appliance manufacturer server according to the manufacturer server information of the target household appliance; the household appliance manufacturer server sends the control command with the specified format to the target household appliance corresponding to the target household appliance ID; and the target household appliance is used for executing the control command.

The preset protocol is a unified protocol previously agreed by the social application server and each household appliance manufacturer server, and the control command with the specified format is a control command which can be identified by the manufacturer server of the target household appliance.

In another embodiment, the device may further include:

a binding release request sending module, configured to send a binding release request with the target household appliance to the social application server, wherein the binding release request is used for releasing the binding relationship with the target household appliance, the binding release request includes the account of the social application client and the account of the target household appliance, and release of the binding relationship is to delete the binding relationship according to the binding release request through the social application server by searching for the binding relationship between the account of the social application client and the account of the target household appliance in a binding relationship mapping table.

In another embodiment, the device may further include:

a feedback information receiving module, configured to receive feedback information sent by the social application server, wherein the feedback information is sent by the target household appliance, forwarded by the household appliance manufacturer server and received by the social application server.

Figure 8:
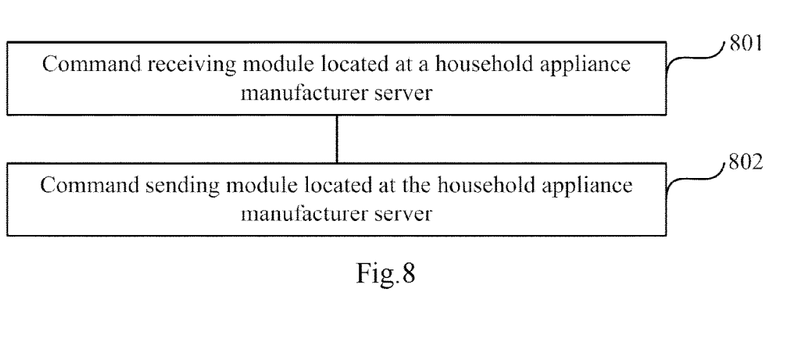
FIG. 8 is a structural block diagram of a third embodiment of a device for remotely controlling a household appliance.

FIG. 8 shows a structural block diagram of a third embodiment of a device for remotely controlling a household appliance, the device may specifically include the following modules:

A command receiving module 801 located at a household appliance manufacturer server, configured to receive a control command with a specified format and a target household appliance ID sent by a social application server;

A command sending module 802 located at the household appliance manufacturer server, configured to send the control command with the specified format to a target household appliance corresponding to the target household appliance ID, wherein the target household appliance is used for executing the control command.

In the embodiment, the device may further include the following modules:

A feedback information receiving module located at the household appliance manufacturer server, configured to receive feedback information sent by the target household appliance, wherein the feedback information includes the target household appliance ID;

A feedback information sending module located at the household appliance manufacturer server, configured to send the feedback information to the social application server, wherein the social application server is used for acquiring an account of a social application client bound with the target household appliance ID and sending the feedback information to the account of the social application client.

Figure 9:
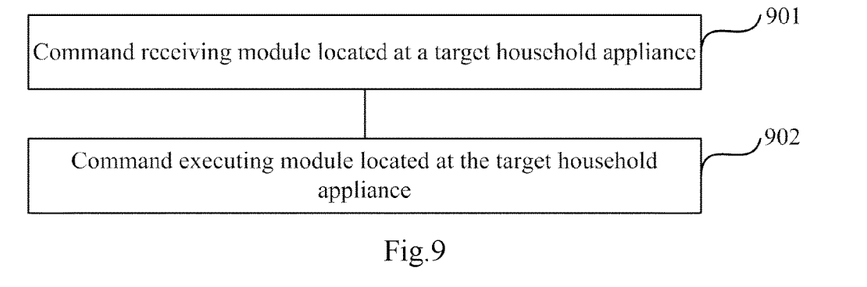
FIG. 9 is a structural block diagram of a fourth embodiment of a device for remotely controlling a household appliance.

FIG. 9 shows a structural block diagram of a fourth embodiment of a device for remotely controlling a household appliance, the device may specifically include the following modules:

A command receiving module 901 located at a target household appliance, configured to receive a control command sent by a household appliance manufacturer server;

A command executing module 902 located at the target household appliance, configured to execute the control command.

In the embodiment, the device may further include the following module:

A feedback information sending module located at the target household appliance, configured to send feedback information to the household appliance manufacturer server, wherein the feedback information includes a target household appliance ID, the household appliance manufacturer server is used for sending the feedback information to the social application server, and the social application server is used for acquiring the account of the social application client bound with the target household appliance ID and sending the feedback information to the account of the social application client.

Figure 10:
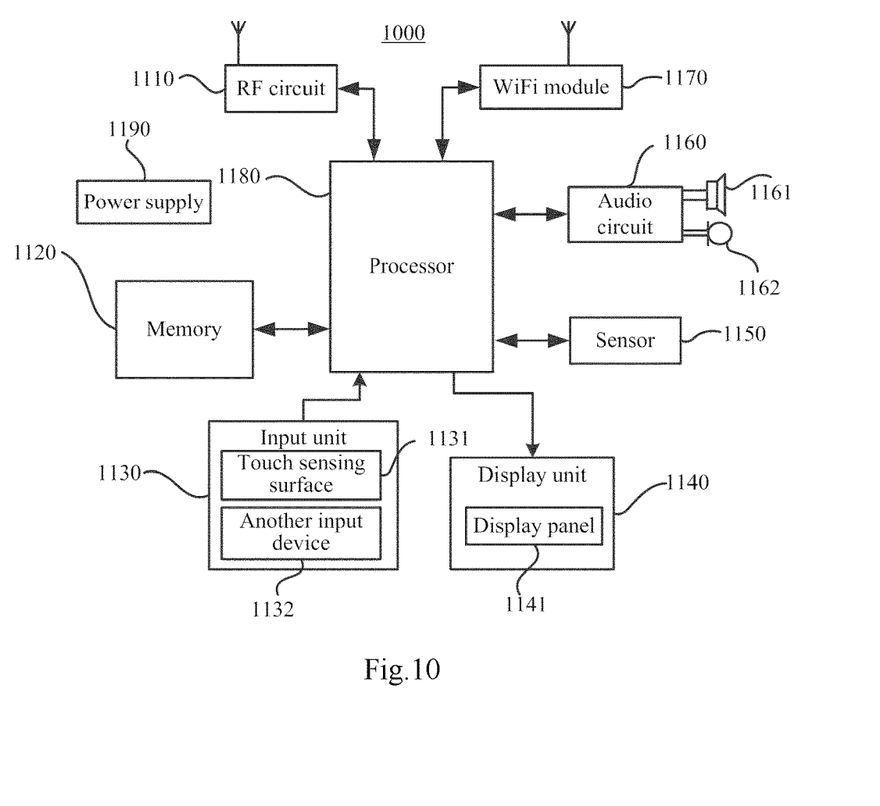
FIG. 10 is a schematic diagram of one embodiment of a device for remotely controlling a household appliance.

FIG. 10 shows a schematic diagram of one embodiment of a device for remotely controlling a household appliance. In this embodiment, The device 1000 may be a handheld device (for example, a cellphone, a tablet computer, a PDA, etc.) and may include an RF (Radio Frequency) circuit 1110, a memory 1120 including one or more computer readable storage mediums, an input unit 1130, an display unit 1140, a sensor 1150, an audio circuit 1160, a WiFi (Wireless Fidelity) module 1170, a processor 1180 including one or more processing cores, and a power supply 1190. Those skilled in the art can appreciate that the structure of the device shown in FIG. 10 is not limiting the embodiments described herein, which may include more or less components than those shown in FIG. 10, or may combine some of the components, or may arranged differently.

The RF circuit 1110 may be configured to send and receive information, or to send and receive a signal during call, and further to transfer downlink information received from a base station to the processor 1180 to process and further to transfer uplink information to the base station. In general, the RF circuit 1110 includes but is not limited to an antenna, at least one amplifier, a tuner, one or more oscillator, an SIM (Subscriber Identity Module), a transceiver, a coupler, an LNA (Low Noise Amplifier), a duplexer, etc. Furthermore, the RF circuit 1110 may communicate with a network and other devices through wireless communications. The wireless communications may use any one of communication standards or protocols including but not limited to GSM (Global System of Mobile communication), GPRS (General Packet Radio Service), CDMA (Code Division Multiple Access), WCDMA (Wideband Code Division Multiple Access), LTE (Long Term Evolution), E-mail, SMS (Short Messaging Service), etc.

The memory 1120 may be configured to store software programs and modules. The processor 1180 executes various functional applications and data processing by running the software programs and the modules stored in the memory 1120. The memory 1120 may mainly include a program storing area and a data storing area. The program storing area may store a operating system, an application required by at least one function (for example, a voice play function, a image play function, etc.), etc. The data storing area may store data (for example, audio data, a telephone book, etc.) created by using the device 1000, etc. Furthermore, the memory 1120 may include a high speed random access memory, and may further include a nonvolatile storage, for example, at least one magnetic disk memory device, a flash memory device, or other volatility solid state memory devices. Correspondingly, the memory 1120 may further include a storage controller, configured to provide an access for the processor 1180 and the input unit 1130.

The input unit 1130 may be configured to receive input numbers or character information and to generate a signal input of a keyboard, a mouse, an operating arm, an optics, or a trackball related to a user setting and a function control. The input unit 1130 may include a touch sensing surface 1131 and another input device 1132. The touch sensing surface 1131 may also be referred to as a touch display screen or a touch control plate, and may collect touch operations of a user on or near to the touch sensing surface 1131 (for example, operations of the user on or near to the touch sensing surface 1131 by using a finger, a touchpen, or any other suitable object or attachment), and drive a corresponding connecting apparatus according to a preset program. Optionally, the touch sensing surface 1131 may include a touch detecting apparatus and a touch controller. The touch detecting apparatus is configured to detect a touch orientation of the user, detect a signal generated from the touch operation and transmit the signal to the touch controller. The touch controller is configured to receive the signal from the touch detecting apparatus, convert the touch information into touch spot coordinates, transmit the touch spot coordinates to the processor 1180, and receive a command sent from the processor 1180 and execute the command. Furthermore, the touch sensing surface 1131 may be implemented by various types, such as a resistor type, a capacitor type, an infrared type, a surface acoustic wave type, etc. Except for the touch sensing surface 1131, the input unit 1130 may further include another input device 1132. The another input device 1132 may include but not limited to one or more of a physics keyboard, a function key (for example, a volume control key, an on/off key, etc.), a trackball, a mouse, and an operating arm, etc.

The display unit 1140 may be configured to display information input by the user or information provided to the user and various graphic user interfaces of the device 1000, wherein the graphic user interfaces may consist of one or a combination of a graph, a text, an icon, and a video. The display unit 1140 may include a display panel 1141. Optionally, the display panel 1141 may be configured with the form of LCD (Liquid Crystal Display), OLED (Organic Light-Emitting Diode), etc. Furthermore, the touch sensing surface 1131 may cover on the display panel 1141. After the touch sensing surface 1131 detects the touch operation on or near to the touch sensing surface 1131, transmits the touch operation to the processor 1180 to determine a type of the touch event, and then the processor 1180 provides a corresponding visual output on the display panel 1141 according to the type of the touch event. Although in FIG. 10, the touch sensing surface 1131 and the display panel 1141 are two separate components to perform the input function and the output function, in some embodiments, the touch sensing surface 1131 and the display panel 1141 may be integrated to perform the input and output functions.

The device 1000 may further include at least one sensor 1150, such as a light sensor, a motion sensor, or other sensors. The light sensor may include an ambient light sensor and a proximity sensor. The ambient light sensor may adjust the brightness of the display panel 1141 according to the brightness of the ambient light, and the proximity sensor may turn off the display panel 1141 and/or the backlight when the device 1000 moves near to the ear. A gravitational acceleration sensor is one of the motion sensors and may detect an acceleration in each of the directions (typically the three axes), and may detect the value and the direction of the gravitation when it is static, and may be used to recognize an application of the cellphone posture (for example, the switch between the landscape mode and the portrait mode, related games, magnetometer posture calibration) and vibration-recognition related functions (for example, a pedometer, a knocking), etc. With respect to a gyroscope, a barometer, a hygrometer, a thermometer, an infrared sensor, and other sensors, which may be configured to the device 1000, the related description is omitted here.

The audio circuit 1160, a loudspeaker 1161 and a microphone 1162 may provide an audio interface between the user and the device 1000. The audio circuit 1160 may convert received audio data into an electrical signal and transmit the electrical signal to the loudspeaker 1161, and the loudspeaker 1161 converts the electrical signal into an acoustical signal and outputs the acoustical signal. On the other hand, the microphone 1162 converts collected acoustical signal into an electrical signal, and the audio circuit 1160 receives the electrical signal and converts the electrical signal into audio data and then outputs the audio data to the processor 1180, the processor 1180 processes the audio data, and the processed audio data is transmitted to, for example, another terminal via the RF circuit 1110, or the audio circuit 1160 outputs the audio data to the memory 1120 to be further processed. The audio circuit 1160 may further include an earphone jack, to provide communication between an peripheral earphone and the device 1000.

The WiFi is a technology for short distance wireless transmission. The device 1000 may assist the user to receive and send E-mail, browse webpage, access streaming media, etc. through the WiFi module 1170, and the WiFi module 1170 provides the user with the wireless broadband Internet access. Although FIG. 10 shows the WiFi module 1170, it can be appreciated that the WiFi module 1170 is not a necessary component of the device 1000 and can be omitted as required without changing the spirit and the scope of the disclosure.

The processor 1180 is a control center of the device 1000 to connect respective parts of the cellphone via various interfaces and lines, and performs various functions of the device 1000 and processes data by running or executing the software programs and/or modules stored in the memory 1120 and invoking the data stored in the memory 1120, to entirely monitor the cellphone. Optionally, the processor 1180 may include one or more processing cores. In an example embodiment, the processor 1180 may integrate an application processor and a modem processor. The application processor mainly processes the operating system, the user interface, and applications, etc. The modem processor mainly processes the wireless communications. It can be appreciated that the modem processor may be not integrated into the processor 1180.

The device 1000 further includes the power supply 1190 (such as a battery) supplying power to the various components. In an example embodiment o, the power supply 1190 may logically connect with the processor 1180 through a power supply management system, so that the functions, such as managing charging, discharging, and power consumption, etc., can be realized by the power supply management system. The power supply 1190 may further include one or more of a direct current power supply or alternating current power supply, a recharging system, a power supply failure detecting circuit, a power adapter or power inverter, a power supply status indicator, etc.

Although not shown, the device 1000 may further include a camera, a bluetooth module, etc, the description of which is omitted here. In the embodiment, the display unit of the terminal is a touch screen display, and the terminal further includes a memory, and one or more programs, wherein the one or more programs are stored in the memory and are configured to be executed by one or more processors. The one or more programs contain instructions for implementing the above embodiments of the method for remotely controlling a household appliance, the repeated description of which is omitted here, and reference can be made to the above description.

Some embodiments further provide a computer readable storage medium storing one or more programs, which when executed by one or more processors to perform the method for remotely controlling a household appliance. With respect to the specific procedure of the method, reference can be made to the description of the embodiments of the method for remotely controlling a household appliance, which is omitted here.

Some of the above embodiments may have the following advantages:

firstly, in the embodiments, a user can directly perform classified control on multiple types of household appliances through the social application client, and the user can control the household appliances as chatting with social friends through private messages at ordinary times after opening the social application client, so it is simple and convenient for the user to use, great convenience is brought for the user to control and manage the household appliances of different manufacturers, the control cost of the household appliances is reduced, and the efficiency of controlling the household appliances is improved; and secondly, in the embodiments, a unified protocol and a unified interface are used when the social application server communicates with each household appliance manufacturer server, so that unified management and control of different household appliance manufacturer devices are realized.

All the embodiments in the specification are described in a progressive manner, what is highlighted in each embodiment is the difference from other embodiments, and for the same or similar portions between the embodiments, reference can be made to each other. Because the embodiments of the device are substantially similar to the embodiments of the method, they are described relatively simply, and for the related portion, reference can be made to the descriptions of the embodiments of the method.

Those skilled in the art shall appreciate that the embodiments can be embodied as a method, a system or a computer program product. Therefore the embodiments can be embodied in the form of an all-hardware embodiment or an embodiment of software and hardware in combination. Furthermore the embodiments can be embodied in the form of a computer program product embodied in one or more computer useable storage mediums (including but not limited to a disk memory, a CD-ROM, an optical memory, etc.) in which computer useable program codes are contained.

The embodiments have been described in a flow chart and/or a block diagram of the method, the device (system) and the computer program product according to the embodiments. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the example embodiments have been described, those skilled in the art benefiting from the underlying inventive concept can make additional modifications and variations to these embodiments. Therefore the appended claims are intended to be construed as encompassing the example embodiments and all the modifications and variations coming into the scope.

In the end, it should be noted that in this application, the term "include", "contain" or any other variants intend to cover non-exclusive containing, so that the process, method, article or device including a series of elements not only includes those elements, but also includes other elements which are not definitely listed, or also includes inherent elements for the process, method, article or device. In the case of no more limitation, the element limited by the statement "include a . . . " does not exclude other same elements also existing in the process, method, article or device including the said element.

The foregoing descriptions introduce a method and device for remotely controlling a household appliance in detail. The principles and embodiments are illustrated by using specific examples in this application, and the descriptions of the foregoing embodiments are merely used for assisting in understanding the methods and ideas. Meanwhile, alterations could be made to the specific embodiments and application ranges according to the ideas described herein by those of ordinary skilled in the art. In conclusion, the contents of the specification should not be understood to limit the present invention.

What is claimed is:

1. A method for remotely controlling a first appliance manufactured by a first manufacturer and a second appliance manufactured by a second manufacturer, comprising:

establishing in a social application server a first social account for the first appliance upon a request from a first manufacturer server of the first manufacturer and a second social account for the second appliance upon a request from a second manufacturer server of the second manufacturer when the first appliance and second appliance leave factory;

sending, from a third social account of the social application server, a first concerning request for the first appliance to the first social account and a second concerning request for the second appliance to the second social account, wherein the first and second concerning requests are used for establishing a mutual concerning relationship with the first appliance and the second appliance;

sending, from the third social account, a first binding request with the first appliance and a second binding request with the second appliance according to the mutual concerning relationship, wherein the first and second binding requests are used for establishing a binding relationship with the first appliance and the second appliance;

sending, from the third social account of the social application server, a first control command and a second control command respectively configured to instruct the first appliance and the second appliance each to execute one of a power-on operation and a power-off operation wherein the first control command identifies the first social account and the second control command identifies the second social account;

receiving, by the social application server, the first control command and the second control command;

identifying, by the social application server, the first manufacturer server and the second manufacturer server from the first control command and the second control command; and sending, by the social application server using a common protocol, the first control command and the second control command respectively to the first manufacturer server and the second manufacturer server, wherein the first manufacturer server subsequently identifies the first appliance from the first control command, reformats the first control command, and sends the reformatted first control command via a first private protocol to the first appliance for execution, and wherein the second manufacturer server subsequently identifies the second appliance from the second control command, reformats the second control command, and sends the reformatted second control command via a second private protocol to the second appliance for execution.

2. The method of claim 1, wherein the binding request identifies the third social account and comprises information of the first appliance including verification information, the first social account and information of the first manufacturer server; and wherein the social application server determines that there is the mutual concerning relationship between the third social account and the first social account, and then acquires an appliance ID corresponding to the first social account, sends the verification information and the appliance ID to the first manufacturer server and receives verification success information returned by the first manufacturer server to generate the binding relationship.

3. The method of claim 1, wherein the social application server, after receiving the first control command and before sending the first control command to the first manufacturer server, acquires the third social account, determines that there is a binding relationship between the third social account and the first social account, acquires an appliance ID corresponding to the first social account, converts the control command into a format according to the common protocol.

4. The method of claim 1, wherein the common protocol is pre-defined by the social application server and the first manufacturer and the second manufacturer.

5. The method of claim 1, further comprising:

sending, from the third social account, a binding release request with the first appliance to the social application server to release the binding relationship with the first appliance, wherein the binding release request identifies the third social account and the first social account, and wherein to release the binding relationship comprises deleting the binding relationship from a binding relationship mapping table.

6. A device for remotely controlling a first appliance manufactured by a first manufacturer and a second appliance manufactured by a second manufacturer, comprising at least one processor and a memory, wherein the memory stores therein instructions executable by the at least one processor, and the instructions are executed by the at least one processor to enable the at least one processor to:

establish a third social account with a social application server;

send, from the third social account, a first concerning request and a second concerning request respectively to a first social account and a second social account of the social application server to establish a mutual concerning relationship with the first appliance and the second appliance, wherein the first social account is established for the first appliance upon a request from a first manufacturer server of the first manufacturer and the second social account is established for the second appliance upon a request from a second manufacturer server of the second manufacturer when the first appliance and second appliance leave factory;

send, from the third social account, a first binding request with the first appliance and a second binding request from the second appliance according to the mutual concerning relationship to establish a first binding relationship with the first appliance and a second binding relationship with the second appliance;

send, from the third social account to the social application server, a first control command and a second control command respectively configured to instruct the first appliance and the second appliance each to execute one of a power-on operation and a power-off operation, wherein the first control command identifies the first social account and the second control command identifies the second social account;

control the first appliance via the first manufacturer server and the second appliance via the second manufacturer server to perform one of the power-on operation and the power-off operation, wherein the first manufacturer server and the second manufacturer respectively receive the first control command and second control command sent from the social application server using a common protocol, identifies the first appliance and the second appliance from the first control command and the second control command, reformats the first control command and the second control command, and sends the reformatted first control command and second control command respectively via a first private protocol and a second private protocol to the first appliance and the second appliance for execution.

7. The device of claim 6, wherein the binding request identifies the third social account and comprises information of the first appliance including verification information, the first social account and information of the first manufacturer server; and wherein the social application server determines that there is the mutual concerning relationship between the third social account and the first social account, and then acquires an appliance ID corresponding to the first social account, sends the verification information and the appliance ID to the first manufacturer server and receives verification success information returned by the first manufacturer server to generate the first binding relationship.

8. The device of claim 6, wherein the social application server, after receiving the first control command and before sending the first control command to the first manufacturer server, acquires the third social account, determines that there is a binding relationship between the third social account and the first social account, acquires an appliance ID corresponding to the first social account, converts the control command into a format according to the common protocol.

9. The device of claim 6, wherein the common protocol is pre-defined by the social application server and the first manufacturer and the second manufacturer.

10. The device of claim 6, wherein the instructions are executed by the at least one processor to enable the at least one processor further to:

send a binding release request with the first appliance to the social application server to release the first binding relationship with the first appliance, wherein the binding release request identifies the third social account and the first social account, and wherein to release the binding relationship comprises deleting the first binding relationship from a binding relationship mapping table.

11. A non-transitory computer readable storage medium storing one or more programs, which when executed by one or more processors to controlling a first appliance manufactured by a first manufacturer and a second appliance manufactured by a second manufacturer by:

establishing a third social account with a social application server;

sending, from the third social account, a first concerning request and a second concerning request respectively to a first social account and a second social account of the social application server to establish a mutual concerning relationship with the first appliance and the second appliance, wherein the first social account is established for the first appliance upon a request from a first manufacturer server of the first manufacturer and the second social account is established for the second appliance upon a request from a second manufacturer server of the second manufacturer when the first appliance and second appliance leave factory;

sending, from the third social account, a first binding request with the first appliance and a second binding request from the second appliance according to the mutual concerning relationship to establish a first binding relationship with the first appliance and a second binding relationship with the second appliance;

sending, from the third social account to the social application server, a first control command and a second control command respectively configured to instruct the first appliance and the second appliance each to execute one of a power-on operation and a power-off operation, wherein the first control command identifies the first social account and the second control command identifies the second social account;

controlling the first appliance via the first manufacturer server and the second appliance via the second manufacturer server to perform one of the power-on operation and the power-off operation, wherein the first manufacturer server and the second manufacturer respectively receive the first control command and second control command sent from the social application server using a common protocol, identifies the first appliance and the second appliance from the first control command and the second control command, reformats the first control command and the second control command, and sends the reformatted first control command and second control command respectively via a first private protocol and a second private protocol to the first appliance and the second appliance for execution.

\* \* \* \* \*